May 30, 1961 E. W. JACOBS ET AL 2,986,607

ADJUSTABLE SUPPORT MEANS FOR A MAGNETIC RECORDING OR REPRODUCING HEAD

Filed Oct. 21, 1957 3 Sheets-Sheet 1

Inventors:
Eric William Jacobs
Leonard John Rigbey
By:
Stevens, Davis, Miller & Mosher
Attorneys May 30, 1961

E. W. JACOBS ET AL

ADJUSTABLE SUPPORT MEANS FOR A MAGNETIC RECORDING OR REPRODUCING HEAD 2,986,607

Filed Oct. 21, 1957

3 Sheets-Sheet 2

Inventors:
Eric William Jacobs
Leonard John Rigbey
By: Stevens, Davis, Miller & Mosher
Attorneys Inventors:
Eric William Jacobs
Leonard John Rigbey
By: Stevens, Davis, Miller & Mosher
Attorneys United States Patent Office
2,986,607
Patented May 30, 1961

2,986,607

ADJUSTABLE SUPPORT MEANS FOR A MAGNETIC RECORDING OR REPRODUCING HEAD

Eric William Jacobs, London, and Leonard John Rigbey, Surrey, England, assignors to The English Electric Company Limited, London, England, a British company Filed Oct. 21, 1957, Ser. No. 691,435

4 Claims. (Cl. 179—100.2)

Figure 1:
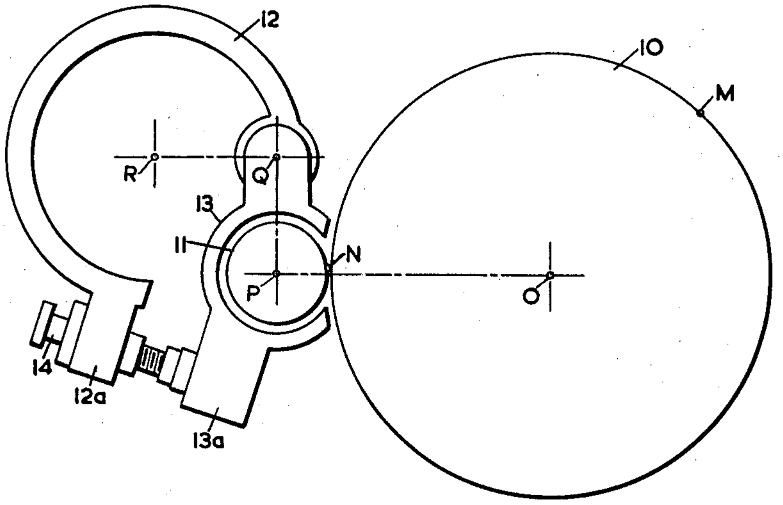

This invention relates to magnetic recording and reproducing systems and is particularly concerned with means in such systems for supporting and adjusting the position of a recording or reproducing head with respect to a recording medium.

According to one aspect of the invention, in a magnetic record transducing apparatus for recording or reproducing signals on a cylindrical drum mounted to rotate about its axis, a transducer head support system comprises a structure pivotally mounted for angular adjustment about an axis parallel with the drum axis to permit the structure to turn as a unit to swing a transducer head away from the drum whilst providing means for a coarse setting of the head position relative to the record surface of the drum, said structure comprising, in combination with its pivotal mounting, a frame member which bears pivotal surfaces of said mounting, a linkage supporting said transducer head having the configuration of an arm which is pivotally connected at one end to said frame member and includes an intermediate pivotal connection which divides the arm into rear arm and forearm elements, all pivot axes being parallel, first adjustable locating means connecting the rear arm element and said frame member operative to provide a positive angular location of the rear arm element about its pivotal connection with the frame member, and second adjustable locating means connecting the forearm and said frame member operative to provide a positive angular location of the forearm element about said intermediate pivotal connection, the head support system being adapted to include in its range of transducer head positions one in which the head is closely adjacent the drum surface with the forearm element of the linkage substantially radial from the drum axis and the angle between the arm elements substantially a right angle, whereby said first and second adjustable locating means co-operate with the coarse setting means provided by the pivotal mounting of the frame member to provide respectively for the fine setting of the gap between the transducer head and the drum surface and the fine setting of the head position along the drum surface in the record direction.

According to another aspect of the invention, in a magnetic record transducing apparatus for recording or reproducing signals on a cylindrical drum mounted to rotate about its axis, a transducer head support system comprises a structure pivotally mounted for angular adjustment about an axis parallel with the drum axis to permit the structure to turn as a unit to swing a transducer head away from the drum whilst providing means for a coarse setting of the head position relative to the record surface of the drum, said structure comprising, in combination with its pivotal mounting, a frame member which bears pivotal surfaces of said mounting, a linkage supporting said transducer head having the configuration of an arm which is pivotally connected at one end to said frame member and which comprises a part-cylindrical housing for a transducer head unit which is pivotally mounted about the central longitudinal axis of the cylindrical housing so that the transducer head is eccentric from the axis of the housing, all pivot axes being parallel, first adjustable locating means connecting the housing part of the linkage and said frame member operative to provide a positive angular location of the housing about its pivotal connection with the frame member, and second adjustable locating means connecting the housing part of the linkage and the transducer head unit operative to provide a positive relative angular location of the transducer head about the axis of the housing, the head support system being adapted to include in its range of transducer head positions one in which the head is closely adjacent the drum surface with a line joining the transducer head and the axis of the housing substantially radial from the drum axis and the angle between this line and one joining the axis of the housing and the pivotal connection of the linkage with the frame member substantially a right angle, whereby said first and second adjustable locating means co-operate with the coarse setting means provided by the pivotal mounting of the frame member to provide respectively for the fine setting of the gap between the transducer head and the drum surface and the fine setting of the head position along the drum surface in the record direction.

According to a feature of the invention, said second adjustable locating means comprises a pin which is carried by a fixture attached to said frame member in line with the pivotal axis of the connection between the frame member and the housing and which is eccentrically mounted with respect to this axis to be adjustable about this axis, the pin being further in co-operative engagement with and between the bifurcated portions at the end of a forked arm rigidly connected at its other end to the head unit, whereby an angular adjustment of the pin about the axis of its eccentricity is transmitted by the forked arm to produce an angular adjustment of the head unit about the axis of its pivotal mounting in the housing.

According to a still further feature of the invention, said frame member has a hollow part-cylindrical form pivotally mounted for angular adjustment about the central longitudinal axis of its cylindrical form, which is parallel with the drum axis, and has the axis in which the housing is pivotally mounted with respect to the frame member lying substantially along one bounding longitudinal edge of the hollow part-cylindrical form of the frame member, said housing forming a closure for the part-cylindrical form of the frame member and said first adjustable locating means comprising an adjusting screw locating device mounted between the frame member adjacent the other bounding longitudinal edge of its part-cylindrical form and a part of the housing remote from the axis of its pivotal mounting.

Figure 4:
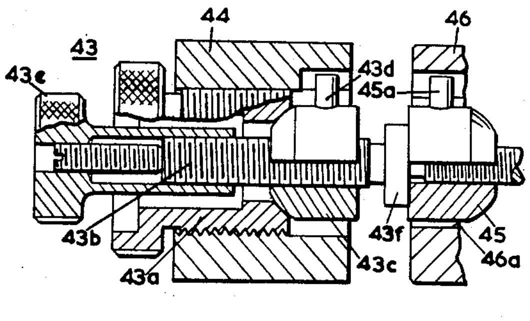
Figure 2:
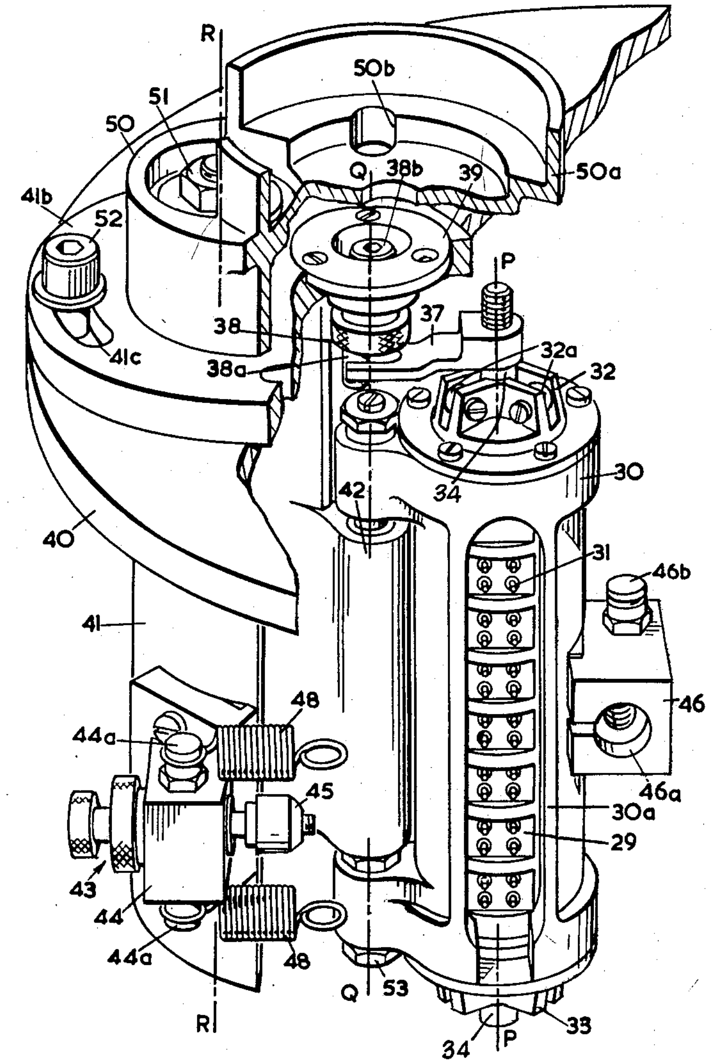
Figure 3:
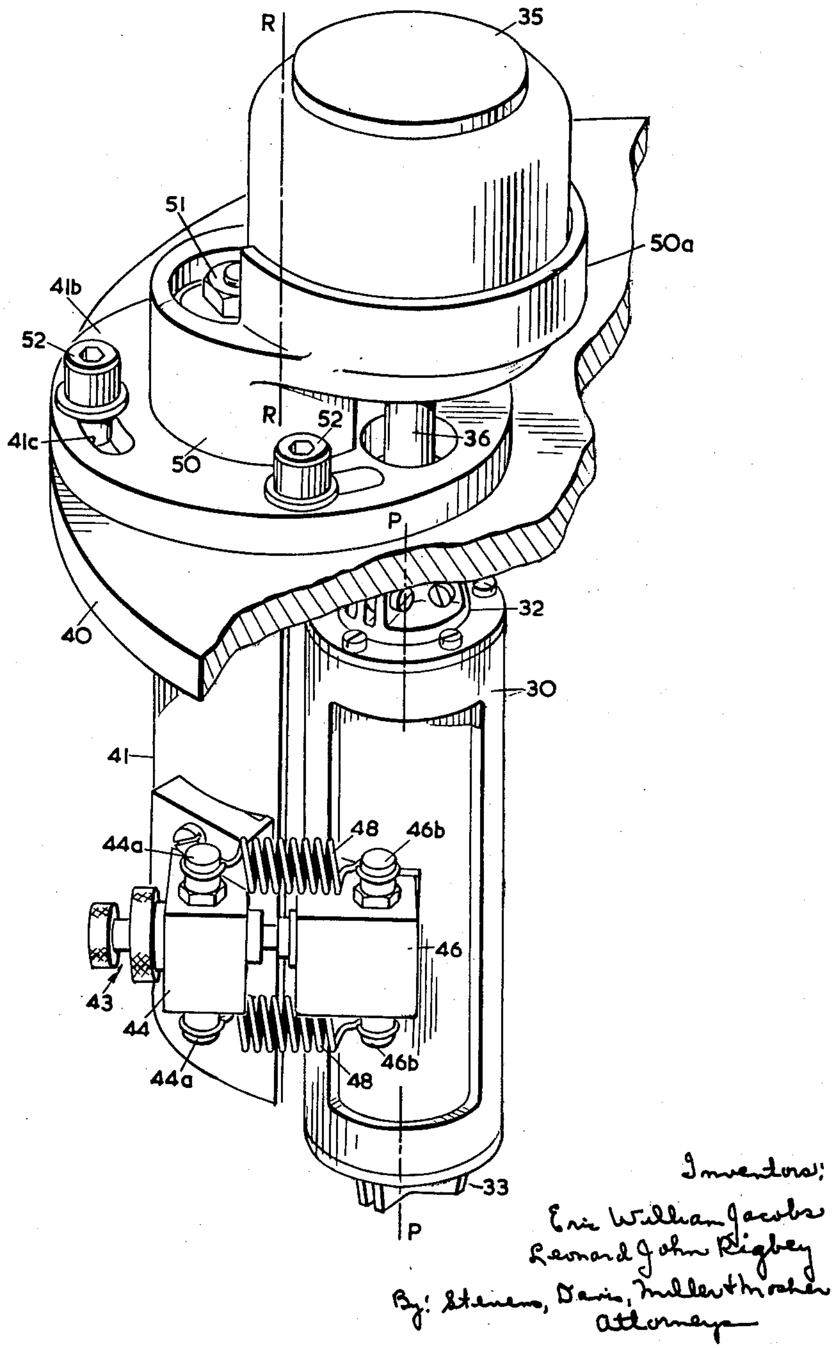

The invention and its various features will now be described with reference to the accompanying drawings in which:

Fig. 1 illustrates schematically the structural arrangement of an arm structure embodied in a preferred embodiment of the invention, Fig. 2 illustrates a preferred embodiment of the invention when partly assembled, Fig. 3 illustrates the embodiment shown in Fig. 2 when assembled in its operative position, and Fig. 4 shows a vernier screw device used in the embodiment shown in Figs. 2 and 3.

Referring now to Fig. 1 a magnetic drum 10 is shown to have an axis O. The plane of the paper may be regarded as being perpendicular to this axis O. A fixed axis R, parallel with the axis O is shown a small distance away from the surface of the drum 10. An arm structure is assumed to be pivotally mounted so as to turn about the axis R, this structure having an elbow at Q and having mounted at the end of the "forearm" QP a head unit 11 which may be turned about the axis P. This axis P is also parallel with the axis O. With such a system it is possible to adjust the position of the head unit 11 with respect to the surface of the drum 10. Two degrees of freedom are associated with the movement of the head unit so that the axis P of this unit may be moved both radially and circumferentially with respect to the axis O of the drum.

A point N on the head unit 11 depicts the nose of a recording or reproducing head and it is assumed that the purpose of the arm structure is to adjust the position of N with respect to the drum surface. Consider that at some point M near the surface of the drum, information is being recorded on the drum. The drum rotates at a speed which is maintained constant and it is of importance in practical fields of application of magnetic recording drums that there be a correct phase relationship between the information reproduced from the drum and the information being recorded on the drum. This is of particular importance where more than one recording track on the drum is being used simultaneously. In order to secure the correct phase relationship between the recorded and reproduced information, it is necessary to have some means for adjusting the position of the nose N with respect to the point M and this may be achieved by the system shown diagrammatically in Fig. 1. With such a system a preliminary adjustment of the position of N can be made by rotating QR about R. The distance between N and the surface of the drum may then be adjusted by moving PQ about Q. Such an adjustment may be regarded as a coarse phase adjustment. A fine phase adjustment may then be achieved by turning the head unit about the axis P until the nose N has a suitable position. Provided N is near to the line OP there will be little interference between the coarse and fine adjustments and the system will, in practice, function properly. Minimum interference between the coarse and fine adjustments is obtained when the angles OPQ and PQR are both right angles.

A convenient arm structure working on the above principle is that shown in Fig. 1. The arm QR is formed by the member 12 which has a part-cylindrical form and forms a casing element. This casing element partly surrounds the head unit 11. The arm QP is formed by the part-cylindrical mounting 13 which pivots about the axis Q and carries bearings (not shown) for supporting the head unit 11 so that it may turn about the axis P. The noses of the heads in the head unit project through an aperture in the mounting 13 between the drum and the head unit. Both the member 12 and the mounting 13 carry radially projecting lugs **12*a* and 13*a* respectively. These lugs face one another and a vernier screw attachment 14** determines their relative disposition.

In order to adjust the position of the nose N on the head unit 11, the member 12 is first adjusted to have a suitable angular position with respect to the axis R and the vernier screw attachment 14 is then adjusted so that P moves angularly about the axis Q. Finally, the head unit may be turned about the axis P to the required position.

Referring to Figs. 2 and 3 one practical embodiment of the invention is illustrated, a carriage for a magnetic recording or reproducing head unit being shown open in Fig. 2 and closed in Fig. 3.

Referring to these figures, the multiple head unit 29 is carried by the mounting 30. The noses of the head unit are not shown in either figure, but the terminals 31 for connecting leads to the windings on the recording heads are shown, these terminals being opposite to the noses. The multiple head unit has sixteen heads and there are sixteen corresponding pairs of terminals 31. It is carried by the mounting 30 in the bearings 32 and 33 disposed at each end of the mounting. Each of these bearings carries three rollers **32*a* which are spaced around the spigots 34 at each end of the head unit and arranged to bear against the surfaces of the spigots. These surfaces are ground concentric with the tips of the noses of the recording or reproducing heads carried by the head unit. The rollers 32*a* are mounted eccentrically in the bearings 32** and this enables the alignment of the head unit to be adjusted with respect to the mounting.

Besides locating the head unit along its axis P—P the rollers **32*a* allow axial movement of the head unit with respect to the mounting 30. An adjustment of the axial position of the head unit may be effected by magnetic means carried within the casing 35. This casing 35 contains a permanent magnet having a cylindrical pole piece and an armature carried by the spindle 36 which, in the fully assembled condition, is attached to the end of the spigot 34. The armature carries a coil which, when energized, serves to produce an electro-magnetic force which is applied to move the head unit axially in the mounting 30**.

The end spigot 34 has, rigidly attached to it, an arm 37 which is forked at the end and engages a pin **38*a* carried eccentrically by an adjustment wheel 38. This wheel is supported by the fixture 39 mounted in the top plate 40 of the structure housing the magnetic recording system. By turning the wheel 38 the pin 38*a* is adjusted in position, causing the forked arm 37 to swing through a small angle about a neutral position. In this way, the position of the wheel 38 determines the angular position of the head unit with respect to the mounting 30. The wheel 38 may be locked in position by the locking nut 38*b***.

Beneath the top plate 40 is the part-cylindrical casing 41 and the bracket 42. The casing 41 and the bracket 42 form an integral unit. This unit has a flanged rim **41*b* attached at one end. This rim engages the upper face of the top plate 40** through an aperture in which the unit passes.

The mounting 30 is arranged to pivot about the axis Q—Q passing through this bracket. This axis is also the central axis of the wheel 38. In Fig. 2 the mounting 30, with the head unit 29, is shown to be swung away from the casing 41 whereas in Fig. 3 the mounting 30 is shown to be swung round so that it fits partly within the casing. Fig. 1 illustrates this latter position diagrammatically. It will be noted that owing to the position of the pin **38*a* with respect to the axis Q—Q the forked arm 37 serves to maintain the terminals 31 adjacent to the axially extending slot 30a in the mounting 30** as the mounting is swung from the position shown in Fig. 2 to that shown in Fig. 3.

The relative angular positions of the mounting 30 and the casing 41 may be adjusted by the vernier screw device 43 which is carried by a lug 44 on the casing 41. This vernier screw device may be adjusted so that a nut member 45 carried by the screw engages a mating recess **46*a* in a plug 46 attached to the mounting 30. Two springs 48 are used to urge the lugs 44 and 46 together, the springs being carried at their ends by studs 44*a* and 46*b* attached respectively to the lugs 44 and 46. This vernier screw device 43 corresponds to the device 14** shown in Fig. 1.

The casing 35 is supported in an eccentric position with respect to the axis R—R of the casing 41 by the structure 50. This structure 50 is bolted to the flanged end of the unit formed by the casing 41 and the bracket 42. Bolt means 51 are used for this purpose. When loose these means permit the structure 50 to move a little with respect to the axis R—R, thus provision is made for clamping the structure 50 to the flanged rim **41*b*** in any suitable position.

The unit formed by the casing 41 and the bracket 42 may be adjusted in respect of its angular position about the axis R—R. This adjustment is permitted by the circumferential slots **41*c* through which the bolts 52 clamp the flanged rim 41*b* to the top plate 40**.

By adjusting the angular position of the unit formed by the casing 41 and the bracket 42 with respect to the axis R—R, the axis Q—Q is moved about the axis R—R. The axis P—P of the unit head 29 may also be moved, in this case about the axis Q—Q. The degree of angular movement of the flanged rim 41*b* about the axis R—R is determined by the relative sizes of the slots 41*c* and the bolts 52. Such an adjustment is of the order of 10° in the embodiment shown.

Referring to Fig. 1, it will be seen that when QR is moved through an angle of about 5° either way about the axis R, the movement of QP with respect to QR in order that the point N may be retained closely adjacent to the surface of the drum 10, is also of the order of 5° either way about the means position. QP may be adjusted with respect to QR by the vernier screw device 14, provision being made for a coarse adjustment and a fine adjustment in this device. The purpose of these adjustments is to alter the position of the point N with respect to the point M, says, shown in Fig. 1. Thus, referring to Fig. 1, consider the axis Q to be moved a small distance in the direction PQ. Accompanying this movement the lug 12*a* will move in a direction anti-clockwise as shown. The axis P will have been moved a corresponding distance in the direction PQ, but since the distance OP should be retained substantially constant, the vernier screw device 14 must be correspondingly adjusted so that the lug 13*a* has not moved appreciably in the clockwise or anti-clockwise sense. Since the distance OP is considerably greater than the distance RQ, the angular movement of the axis P about the axis O will be correspondingly smaller than the angular movement of the axis Q about the axis R. This mechanical disadvantage enables the point N to be accurately adjusted through a very small distance. This accurate adjustment may be regarded as a coarse adjustment, and a fine adjustment is afforded by enabling the head unit 11 to turn about the axis P. The distance ON is much greater than the distance PN and, accordingly, when the point N is moved through a certain angle with respect to the axis P it moves through a correspondingly smaller angle with respect to the axis O. The arms 37 shown in Fig. 2 and the fork engaging pin 38*a* carried by the fixture 39 enables the head unit 11 to be turned through a very small angle and the adjustment wheel 38 therefore provides a very fine control of the position of the point N. The need for a fine control in the vernier screw attachment 14 arises from the need for a very accurate gap adjustment. The point N has been regarded as the tip of the nose of a recording head carried by the head unit 11, and the distance of this tip from the surface of the drum 10 is very important in such a system.

Comparing Fig. 2 and Fig. 3 it will be noted that when the head unit 29 and the mounting 30 have the position shown in Fig. 2, the magnet system has been detached. To execute a phasing adjustment starting from the position of the system as shown in Fig. 2, it is necessary to swing the mounting 30 round about the axis Q—Q and connect the springs 48 to the studs 46*b*. The preliminary adjustment of the unit formed by casing 41 and the bracket 42 about the axis R—R is then made. The final adjustment as effected by the adjustment wheel 38 may then be made until the noses of the recording heads carried by the head unit 29 have the required position. Minor adjustments such as the adjustment of the eccentrically mounted rollers 32*a* in the bearings 32 and an adjustment of the axial position of the mounting 30 with respect to the bracket 42 may also be carried out. This latter mentioned adjustment is made possible by the adjustable unit 53. Once these adjustments have been made the adjustable wheel 38 can be locked in position by the locking nut 38*b*, access to this locking nut 38*b* being afforded through the hole 50*b* in the space on the eccentrically mounted carriage 50*a* for the magnet. The spindle 36 to which the armature of the magnetic device is attached is then introduced through the central hole in the carriage 50*a* and screwed on to the threaded end of the spigot 34. Next an annular yoke member of the magnet structure is introduced into the carriage 50*a* and the structure 50 is adjusted so that there is a clearance between the armature and the yoke member. The structure 50 is clamped in this position by the bolt means 51 and finally the casing 35 which carries the permanent magnet and the central pole piece is attached to complete the structure shown in Fig. 3.

In Fig. 4 the vernier screw device 43 is illustrated in detail. The device consists of a cylindrical casing member 43*a* which is threaded on its outer surface so that it may be screwed into the lug 44. The position of the member 43*a* may be adjusted manually with respect to the lug 44. An adjustment of this kind constitutes a coarse adjustment of the device. The device serves to adjust the position of the nut member 45 with respect to that of the nut member 43*c*. The member 45 engages the recess 46*a* in the lug 46 when the system has the position shown in Fig. 3, and the member 43*c* engages the casing member 43*a*. Both of the nut members 43*c* and 45 have spherical seatings to prevent misalignment, and both have an internal thread and are screwed on to the threaded shaft 43*b*. Further, each nut member has a radial projection 43*d* and 45*a* respectively. These projections travel in slots in the lug 46 and 44 respectively and they serve to prevent the nut members 43*c* and 45 from rotating about the axis of the shaft 43*b*.

The part of the shaft 43*b* which engages the member 45 has a thread of different pitch from that of the part which engages the member 43*c*. For example, the thread on the part of the shaft 43*b* which engages the member 45 may be 4BA whereas the thread over the part which engages the member 43*c* may be 2BA. When the shaft 43*b* is turned this causes a vernier action to take place which results in a very slight adjustment of the relative positions of the members 45 and 43*c* for a correspondingly large adjustment of the position of the shaft 43*b* with respect to either of these members. The shaft 43*b* is arranged to be turned manually by means of the end screw 43*e*. Between the members 45 and 43*c* is a collar 43*f* attached to the shaft 43*b*. This collar is provided as a safety precaution. In the eventuality of the shaft 43*b* being adjusted so that the members 45 and 43*c* could bear against one another, the high mechanical advantage of the system would set up a comparatively high force between the members when a small force was applied to the end screw 43*e*. This is prevented by the collar 43*f*.

In a magnetic recording and reproducing system which is provided with adjustment means according to the invention, an accurate adjustment of the position of the recording or reproducing head unit with respect to the surface of a recording medium is possible. An important advantage of the invention arises from the particular features of the arrangement described in that free fine adjustments are made possible by a relatively coarse manual adjustment. This enables a high degree of accuracy to be attained without limiting the manufacturing tolerances unduly.

What we claim as our invention and desire to secure by Letters Patent, is:

1. In a magnetic record transducing apparatus for recording or reproducing signals on a cylindrical drum mounted to rotate about its axis, a transducer head support system comprising a structure pivotally mounted for angular adjustment about an axis parallel with the drum axis to permit the structure to turn as a unit to swing a transducer head away from the drum whilst providing means for a coarse setting of the head position relative to the record surface of the drum, said structure comprising, in combination with its pivotal mounting, a frame member which bears pivotal surfaces of said mounting, a linkage supporting said transducer head having the configuration of an arm which is pivotally connected at one end to said frame member and includes an intermediate pivotal connection which divides the arm into rear arm and forearm elements, all pivot axes being parallel, first adjustable locating means connecting the rear arm element and said frame member operative to provide a positive angular location of the rear arm element about its pivotal connection with the frame member, and second adjustable locating means connecting the forearm and said frame member operative to provide a positive angular location of the forearm element about said intermediate pivotal connection, the head support system being adapted to include in its range of transducer head positions one in which the head is closely adjacent the drum surface with the forearm element of the linkage substantially radial from the drum axis and the angle between the arm elements substantially a right angle, whereby said first and second adjustable locating means co-operate with the coarse setting means provided by the pivotal mounting of the frame member to provide respectively for the fine setting of the gap between the transducer head and the drum surface and the fine setting of the head position along the drum surface in the record direction.

2. In a magnetic record transducing apparatus for recording or reproducing signals on a cylindrical drum mounted to rotate about its axis, a transducer head support system comprising a structure pivotally mounted for angular adjustment about an axis parallel with the drum axis to permit the structure to turn as a unit to swing a transducer head away from the drum whilst providing means for a coarse setting of the head position relative to the record surface of the drum, said structure comprising, in combination with its pivotal mounting, a frame member which bears pivotal surfaces of said mounting, a linkage supporting said transducer head having the configuration of an arm which is pivotally connected at one end to said frame member and which comprises a part-cylindrical housing for a transducer head unit which is pivotally mounted about the central longitudinal axis of the cylindrical housing so that the transducer head is eccentric from the axis of the housing, all pivot axes being parallel, first adjustable locating means connecting the housing part of the linkage and said frame member operative to provide a positive angular location of the housing about its pivotal connection with the frame member, and second adjustable locating means connecting the housing part of the linkage and the transducer head unit operative to provide a positive relative angular location of the transducer head about the axis of the housing, the head support system being adapted to include in its range of transducer head positions one in which the head is closely adjacent the drum surface with a line joining the transducer head and the axis of the housing substantially radial from the drum axis and the angle between this line and one joining the axis of the housing and the pivotal connection of the linkage with the frame member substantially a right angle, whereby said first and second adjustable locating means co-operate with the coarse setting means provided by the pivotal mounting of the frame member to provide respectively for the fine setting of the gap between the transducer head and the drum surface and the fine setting of the head position along the drum surface in the record direction.

3. In a magnetic record transducing apparatus according to claim 2, said second adjustable locating means comprising a pin which is carried by a fixture attached to said frame member in line with the pivotal axis of the connection between the frame member and the housing and which is eccentrically mounted with respect to this axis to be adjustable about this axis, the pin being further in co-operative engagement with and between the bifurcated portions at the end of a forked arm rigidly connected at its other end to the head unit, whereby an angular adjustment of the pin about the axis of its eccentricity is transmitted by the forked arm to produce an angular adjustment of the head unit about the axis of its pivotal mounting in the housing.

4. In a magnetic record transducing apparatus according to claim 2, said frame member having a hollow part-cylindrical form pivotally mounted for angular adjustment about the central longitudinal axis of its cylindrical form, which is parallel with the drum axis, and having the axis in which the housing is pivotally mounted with respect to the frame member lying substantially along one bounding longitudinal edge of the hollow part-cylindrical form of the frame member, said housing forming a closure for the part-cylindrical form of the frame member and said first adjustable locating means comprising an adjusting screw locating device mounted between the frame member adjacent the other bounding longitudinal edge of its part-cylindrical form and a part of the housing remote from the axis of its pivotal mounting.

References Cited in the file of this patent

UNITED STATES PATENTS

| | | |
|---|---|---|
| 2,535,480 | Begun | Dec. 26, 1950 |
| 2,644,856 | Pettus | July 7, 1953 |
| 2,668,879 | D'Arcy | Feb. 9, 1954 |
| 2,685,492 | Gabriel | Aug. 3, 1954 |
| 2,708,693 | Hendrickson | May 17, 1955 |
| 2,721,743 | Erikson et al. | Oct. 25, 1955 |